Jan. 26, 1932.  J. ROWAN  1,843,094
EYEGLASS MIRROR
Filed July 11, 1930
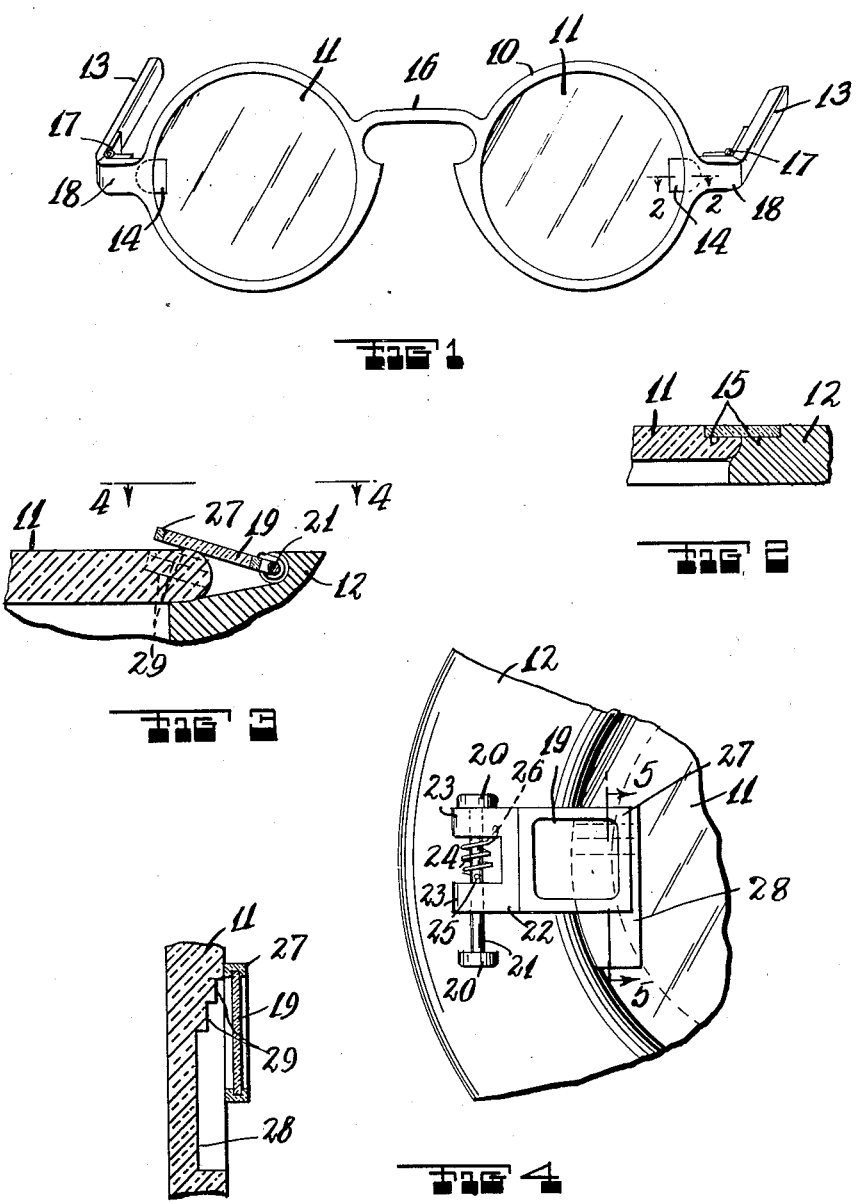
INVENTOR
John Rowan
BY
ATTORNEY Patented Jan. 26, 1932

1,843,094

UNITED STATES PATENT OFFICE

JOHN ROWAN, OF NEW YORK, N. Y.

EYEGLASS MIRROR

Application filed July 11, 1930. Serial No. 467,226.

This invention relates to new and useful improvements in eyeglass mirrors.

The invention has for an object the provision of a device of the class mentioned which is of simple durable construction, dependable in use and efficient in action, and which can be manufactured and sold at a reasonable cost.

The invention proposes a pair of eyeglasses consisting of lenses within a frame and ear bars connected on the frame, and mirrors attached in recesses partially in the lenses and partially in the frame and to the inner sides of said ear bars.

The invention also proposes means for hingedly supporting said mirrors and for holding the mirrors in angular adjusted positions.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a pair of eyeglasses equipped with mirrors according to this invention.

Fig. 2 is a fragmentary vertical sectional view taken on the line 2—2 of Fig. 1.

Fig. 3 is a view similar to Fig. 2, but illustrating a modification.

Fig. 4 is a fragmentary elevational view looking in the direction of the line 4—4 of Fig. 3.

Fig. 5 is a fragmentary sectional view taken on the line 5—5 of Fig. 4.

The eyeglass mirror comprises a pair of eyeglasses 10 consisting of lenses 11 within a frame 12 and ear bars 13 connected on the frame, and mirrors 14 attached in recesses 15 partially in the lenses 11 and partially in the frame 12 and to the inner sides of said ear bars.

The pair of glasses 10 may be of any conventional design and construction. The method of mounting the lenses 11 within the frame 12 comprises a pair of lens support portions joined together with a nose bridge 16. The connection between the ear bars 13 and the frame 12 is hinged by pintle pins 17 engaging through the ends of the ear bars and through lugs 18 projecting from the outer sides of the frame 12. The securing of the mirrors 14 within the recesses 15 may be either a forced fit or a cement job, or any other type generally known. The mirror 14 serves to lock the lenses 11 against rotation within the frame 12. The mirrors 14 are located slightly above the ear bars 13 so that a wearer of the glasses may look into the mirrors and over the ear bars to the rear and thus have extra vision.

In the modified form of the device illustrated in Figs. 3, 4 and 5, a pair of glasses have been indicated consisting of lenses 11 within a frame 12, mirrors 19 to the inner sides of ear bars attached upon the frame as previously recited, and means for hingedly supporting said mirrors 19 and for holding the mirrors in angular adjusted positions. Said latter means comprises spaced upper and lower lugs 20 projecting from the frame 12 and supporting stationary vertical pins 21. Brackets 22 are formed with spaced fingers 23 which slidably engage upon the pins 21.

Springs 24 are coaxially arranged upon the pins 21 and have one of their ends attached upon the pins as indicated by reference numeral 25, and their other ends 26 engage in the bracket 22 for normally pivoting the bracket towards the lenses 11. Frames 27 are attached upon the brackets 22 and support the said mirrors 19. These frames extend partially over the lenses 11 and engage in recesses 28 formed in the lenses. These recesses have their top ends formed with a plurality of horizontal steps 29 with the top steps outermost and the bottom steps innermost in the recesses.

Normally the springs 24 pivot the frames 27 against the lenses 21 at the same time urging them upwards. To change the angular position of the mirrors 19, it is merely necessary to manually force the brackets 22 slightly downwards so that the springs 24 are free to pivot the frames 27 into the first step of the recess 28. As will be seen from an inspection of Fig. 3, these change the inclinations of the mirrors. Further changes may be accomplished by continuing to move the brackets 22 downwards so that the springs 26 may pivot the frames 27 inwards against lower and further depressed steps of the recess. Such adjustments change the range of vision of the wearer of the glasses. It allows seeing towards the sides and towards the rear without the necessity of turning one's head.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An eyeglass mirror, comprising a pair of eyeglasses consisting of lenses having recesses on the inner sides thereof, a frame having recesses adjoining the lens recesses, and ear bars connected on the frame, mirrors attached in the recesses partially in the lenses and partially in the frame and to the inner sides of said ear bars, and means for hingedly supporting said mirrors and means for holding the mirrors in angular adjusted positions.

2. An eyeglass mirror, comprising a pair of eyeglasses consisting of lenses having recesses on the inner sides thereof, a frame having recesses adjoining the lens recesses and ear bars connected on the frame, mirrors attached in the recesses partially in the lenses and partially in the frame and to the inner sides of said ear bars, said recesses having steps formed therein, and means for hingedly supporting said mirrors and for holding the mirrors in angular adjusted positions, comprising spring urged frames supporting said mirror and pivotally mounted and urged against the said steps formed in said lenses.

3. An eyeglass mirror, comprising a pair of eyeglasses consisting of lenses having recesses on the inner sides thereof, a frame having recesses adjoining the lens recesses and ear bars connected on the frame, mirrors attached in the recesses partially in the lenses and partially in the frame and to the inner sides of said ear bars, and means for hingedly supporting said mirrors and means for holding the mirrors in angular adjusted positions, comprising spaced upper and lower lugs projecting from the frame, stationary vertical pins fixed between the lugs, brackets slidably mounted upon the pins, frames with said mirrors fixed upon the bracket, means for normally urging the brackets and frames upwards and onto the said recesses formed in the lenses, and means for holding the frames at different inclinations.

4. An eyeglass mirror, comprising a pair of eyeglasses consisting of lenses having recesses on the inner sides thereof, a frame having recesses adjoining the lens recesses and ear bars connected on the frame, mirrors attached in the recesses partially in the lenses and partially in the frame and to the inner sides of said ear bars, and means for hingedly supporting said mirrors and means for holding the mirrors in angular adjusted positions, comprising spaced upper and lower lugs projecting from the frame, stationary vertical pins fixed between the lugs, brackets slidably mounted upon the pins, frames with said mirrors fixed upon the bracket, means for normally urging the brackets and frames upwards and onto the said recesses formed in the lenses, and means for holding the frames at different inclinations, said means for normally urging the brackets and frames upwards and into the said recesses comprising coaxial springs arranged upon the pins and having one of their ends fastened upon the pins intermediate of their ends and the other end engaging the brackets.

5. An eyeglass mirror, comprising a pair of eyeglasses consisting of lenses having recesses on the inner sides thereof, a frame having recesses adjoining the lens recesses and ear bars connected on the frame, mirrors attached in the recesses partially in the lenses and partially in the frame and to the inner sides of said ear bars, and means for hingedly supporting said mirrors and means for holding the mirrors in angular adjusted positions, comprising spaced upper and lower lugs projecting from the frame, stationary vertical pins fixed between the lugs, brackets slidably mounted upon the pins, frames with said mirrors fixed upon the bracket, means for normally urging the brackets and frames upwards and onto the said recesses formed in the lenses, and means for holding the frames at different inclinations, comprising a plurality of horizontal steps formed within the said recesses in the lenses and having the top steps outermost and the bottom steps innermost.

In testimony whereof I have affixed my signature.

JOHN ROWAN.